United States Patent [19]

Dully

[11] 3,876,164

[45] Apr. 8, 1975

[54] VEHICLE OCCUPANT RESTRAINT BELT RETRACTOR

[75] Inventor: Floyd I. Dully, Detroit, Mich.

[73] Assignee: General Motors Corporation, Detroit, Mich.

[22] Filed: Jan. 16, 1974

[21] Appl. No.: 433,754

[52] U.S. Cl............................ 242/107.4; 297/388
[51] Int. Cl............................................. A62b 35/00
[58] Field of Search ...... 242/107.2, 107.4; 297/388; 280/150 SB

[56] References Cited
UNITED STATES PATENTS

| | | | |
|---|---|---|---|
| 3,273,822 | 9/1966 | Merrell | 242/107.4 |
| 3,416,747 | 12/1968 | Stoffel | 242/107.4 |
| 3,421,605 | 1/1969 | Honsen | 242/107.4 X |
| 3,598,335 | 8/1971 | Seeger | 242/107.4 X |
| 3,635,419 | 1/1972 | Pringle | 242/107.4 |
| 3,659,801 | 5/1972 | Romanzi | 242/107.4 |

Primary Examiner—Edward J. McCarthy
Attorney, Agent, or Firm—J. A. Kushman

[57] ABSTRACT

A vehicle occupant restraint belt retractor whose locking against belt unwinding reel rotation is actuated by a pair of locking members pivoted to the retractor housing about spaced vertical axes. Each locking member has a pair of locking portions spaced from each other so as to receive an associated end plate of the retractor belt reel, and a pair of springs respectively bias the locking members to nonlocking positions where the end plates rotate freely between these locking portions. The center of mass of each locking member is located along a line through the associated axis of locking member movement and this line converges with a similar line of the other locking member so that vehicle acceleration or deceleration in any horizontal direction acts against the spring bias of at least one of the locking members to move it toward a locked position where one of its locking portions engages the associated belt reel end plate to initiate locking against belt unwinding reel rotation. Belt tension subsequent to this initial locking actuation causes the belt reel to bodily shift against a spring bias toward and into engagement with fixed locking portions of the retractor housing so that these fixed locking portions then hold the reel against belt unwinding rotation. In one embodiment, the axis of reel rotation is horizontal and the locking members have generally planar configurations that are aligned with each other in a generally coplanar and horizontal relationship. In another embodiment, the belt reel rotates in a horizontally inclined orientation and the locking members are located in horizontal orientations but in vertically spaced relationship with respect to each other.

5 Claims, 7 Drawing Figures

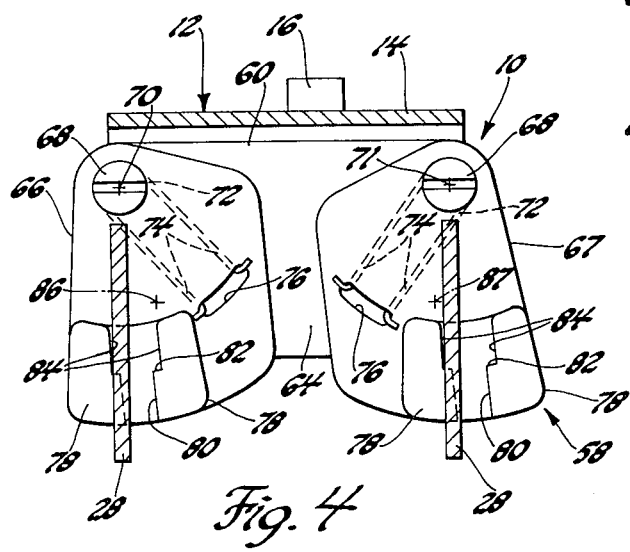
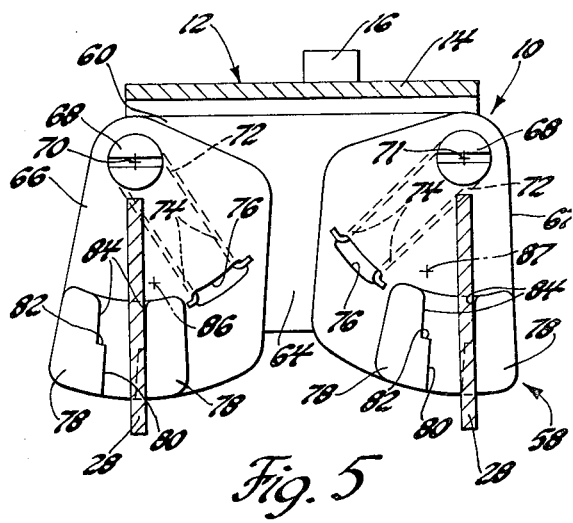
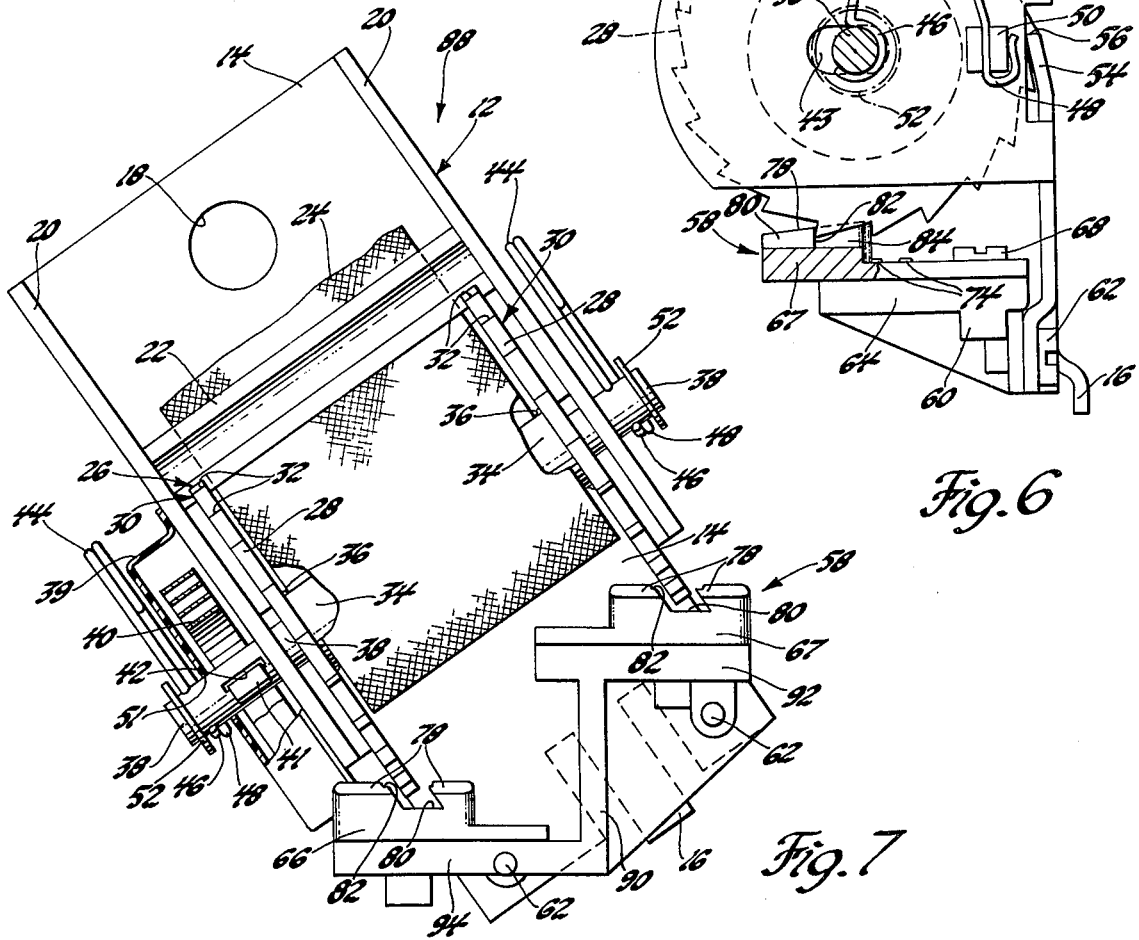
Fig. 4
Fig. 5
Fig. 6
Fig. 7

VEHICLE OCCUPANT RESTRAINT BELT RETRACTOR

BACKGROUND OF THE INVENTION

This invention relates generally to the type of vehicle occupant restraint belt retractor in which the retractor belt reel is locked against belt unwinding rotation in response to abrupt acceleration or deceleration of the vehicle.

Vehicle occupant restraint belt retractors of the past have utilized various inertia members responsive to vehicle acceleration or deceleration in order to initiate locking of the associated retractor belt reel. For the most part, these inertia members have taken the form of swinging pendulums so as to be responsive to vehicle acceleration or deceleration in any horizontal direction. This type of retractor has also been constructed with an upwardly opening conical seat, and a spherical ball is received by the central portion of the seat so as to move radially and upwardly in response to the abrupt change in vehicle movement in a manner that actuates a suitable arrangement for initiating the reel locking. It has also been known to pivot an inertia member to the retractor housing about a generally vertical axis so that abrupt frontal deceleration of the vehicle pivots the inertia member into engagement with the belt itself and thereby provides a wedging action that prevents the belt from being withdrawn from the retractor. In certain applications, having the inertia member pivoted vertically to the retractor housing may be desirable from a packaging standpoint in order to provide a compact retractor arrangement. However, this type of vertically pivoted inertia member does not respond to vehicle acceleration or deceleration in any horizontal direction as do the pendulum and ball types of inertia members.

SUMMARY OF THE INVENTION

One feature of this invention is that it provides a vehicle occupant restraint belt retractor having a pair of locking members respectively pivoted to the retractor housing about a pair of spaced vertical axes and spring biased to nonlocking positions where spaced locking portions of each locking member are positioned on opposite sides of an associated end plate on the retractor belt reel, and the center of mass of each locking member in the nonlocking position is located along a line through the associated pivotal axis of locking member movement so that this line converges with a similar line of the other locking member in a finite angle when viewed in a vertical direction such that vehicle acceleration or deceleration in any horizontal direction moves at least one of the locking members against its spring bias toward a locking position where one of the locking portions thereof engages the associated reel end plate to actuate locking of the belt reel against belt unwinding rotation. Another feature of the invention is that it provides such a retractor in which the two locking members are symmetrical and have horizontally extending generally planar configurations from which the locking portions of each extend upwardly in spaced relationship to each other so as to receive the lower side of the associated reel end plate in the nonlocking position and to engage the end plate in the locking position. Another feature of the invention is that it provides such a belt retractor in which the reel is bodily shiftable toward a pair of fixed locking portions on the retractor housing and normally held in spaced relationship with respect to these fixed locking portions by a spring bias, and belt tension subsequent to the locking actuation of the pivotable locking members shifts the belt reel against its spring bias to engage the reel end plates with the fixed locking portions of the housing so as to thereby hold the reel against belt unwinding rotation. Another feature of the invention is that it provides such a retractor in which the belt reel may rotate horizontally with the planar configurations of the locking members aligned with each other in a generally coplanar and horizontal relationship or, alternately, the axis of reel rotation may be inclined horizontally with the locking members located in horizontal orientations spaced vertically with respect to each other so as to be respectively adjacent the associated reel end plates to initiate the reel locking by engagement with these end plates.

BRIEF DESCRIPTION OF THE DRAWINGS

The above-specified features and other features, objects and advantages of the present invention are readily apparent from the following detailed description of the preferred embodiments and the drawings in which:

FIGS. 4 and 5 are views similar to FIG. 3 but show the locking members moved to locking positions in response to horizontal acceleration or deceleration of the vehicle carrying the retractor so as to initiate locking of the belt reel against belt unwinding rotation.

FIG. 6 is a view taken similarly to FIG. 2 but shows the reel after locking thereof has been actuated by the locking members shown in FIGS. 3 through 5 so that the reel is bodily shifted against its spring bias into engagement with the fixed locking portions of the housing and thereby held against belt unwinding rotation; and FIG. 7 is a view similar to FIG. 1 of another embodiment of the retractor in which the belt reel is oriented so as to rotate in a horizontally inclined relationship and the locking members assume horizontally extending orientations vertically spaced with respect to each other so as to be located adjacent the associated end plates of the reel.

DETAILED DESCRIPTION OF THE PREFERRED EMBODIMENTS

Figure 1:
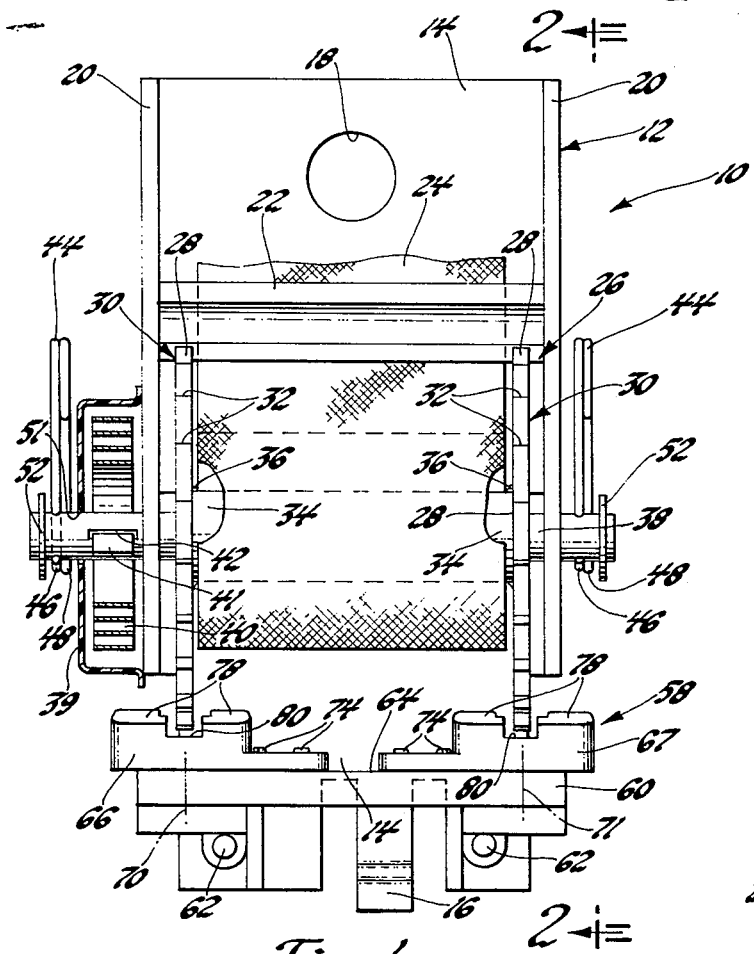
FIG. 1 is a side elevation view of one embodiment of a vehicle occupant restraint belt retractor, according to this invention, whose belt reel is locked against belt unwinding rotation by a pair of locking members adjacent the lower side of the reel.

Reference generally to FIG. 1 of the drawings shows a vehicle occupant restraint belt retractor 10, according to this invention, which includes a metallic housing that is generally indicated by 12. A base wall 14 of the retractor housing includes a lower flange 16 that is inserted within an aperture of a vehicle body member on which the retractor is to be mounted. An upper aperture 18 of the retractor base wall 14 then receives a suitable attachment bolt so that the retractor is mounted in a fixed condition on the vehicle body with the housing 12 extending in the vertical orientation shown. At each of the sides of the housing base wall 14, integral side walls 20 of the housing extend away from the base wall in parallel relationship with respect to each other. A metallic belt guide 22 extends between the side walls 20 of the retractor in a parallel relationship to the base wall 14, and has each of its ends secured to the adjacent side wall in a suitable manner such as by welding. As can be seen by additional reference to FIG. 2, a belt 24 extends downwardly over the belt guide 22 in a somewhat rounded V-shaped configuration and is received by a belt reel indicated generally by 26.

Figure 2:
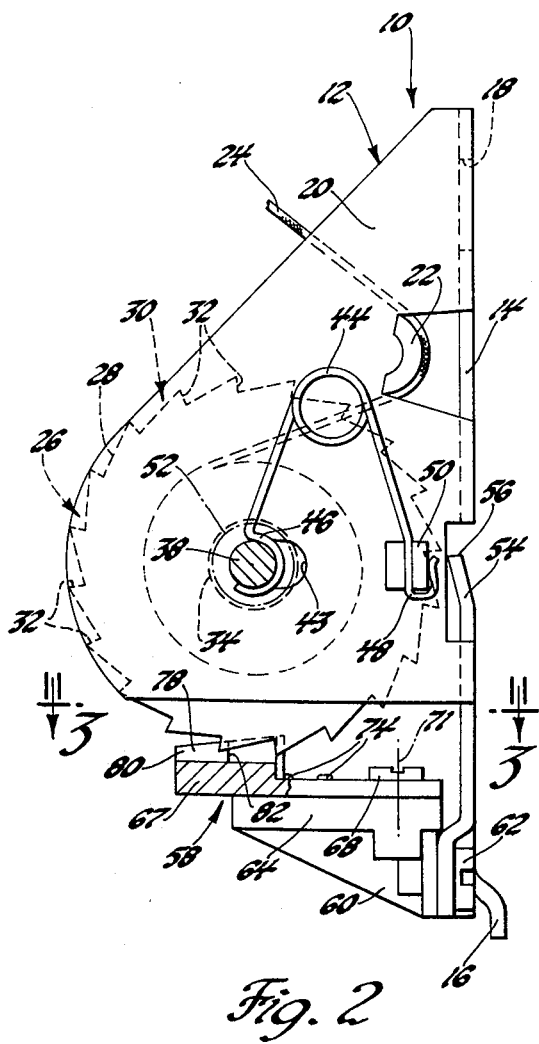
FIG. 2 is an end view of the retractor taken generally along line 2—2 of FIG. 1 and shows the manner in which the belt reel is spring biased away from a pair of fixed locking portions on the right-hand side of the retractor housing.

As can be seen in FIG. 1, the belt reel 26 includes a pair of metallic end plates 28 respectively adjacent the housing side walls 20 in a parallel relationship with respect to these side walls. As can be seen in FIG. 2, the peripheries of the reel end plates 28 define annular ratchet configurations 30 with locking surfaces 32 facing in the belt unwinding direction of reel rotation. Reference back to FIG. 1 shows that a belt drum 34 extends between the reel end plates and is suitably secured thereto such as by welds 36. The inner end of belt 24 is suitably secured to belt drum 34 so that the belt is wound and unwound from the belt reel 26 during rotation thereof in opposite directions. A central shaft 38 of the belt reel also extends between the end plates 28 and is suitably splined or keyed thereto so as to rotate with the end plates during rotation of the belt reel. The opposite ends of shaft 38 extend through the adjacent side walls, in a manner to be more fully hereinafter described, so as to be supported about a generally horizontal axis for rotational movement in either belt winding or unwinding directions of reel rotation. The lefthand end of shaft 38, as seen in FIG. 1, extends through a plastic cover 38 that is suitably secured to the outer side of the adjacent housing side wall and has a round cup-shaped configuration. A spiralling clock type spring 40 is received by this cover and has its outer end, not shown, suitably secured to the cover 39 or to the adjacent housing side wall. The inner end 41 of this spring is passed through a slot 42 in the reel shaft 38 and is hooked over the shaft so that the spring provides a constant bias that urges the belt reel 26 in its belt winding direction of rotation.

Reference to FIG. 2 illustrates the manner in which the housing side walls 20 rotatably support the opposite ends of belt reel shaft 38. The housing side wall therein shown defines an oblong aperture 43 through which the shaft 38 extends outwardly of the retractor housing. A torsion spring 44 has a crook-shaped end 46 that partially encircles the outer end of the reel shaft 38 and also has a hook-shaped end 48 that is integrally clamped over a flange 50 of the housing side wall 20. The other side wall 20 associated with the FIG. 1 lefthand end of reel shaft 38 has a like aperture 43 and the spring cover 39 likewise has a similar oblong aperture 51 that is aligned with the wall apertures 43. The lefthand end of the reel shaft 38, as viewed in FIG. 1, is associated with a spring 44 similar to the one at its righthand end. These springs 44 are prevented from sliding off the ends of the shaft by snap rings 52. The springs 44 thus cooperate to bias the belt reel 26 to the left as shown in FIG. 2. The ratchet configurations 30 of the reel end plates 28 are thus maintained out of engagement with a flange 54 of the housing base wall 14. This flange 54 defines spaced locking portions 56 that are respectively aligned with the reel end plates at each end of the reel. Thus, the belt 24 is normally free to be manually withdrawn from the retractor 10 against the bias of the spring 40, and manual release of the belt causes this spring to wind the belt back to a stored condition.

Figure 3:
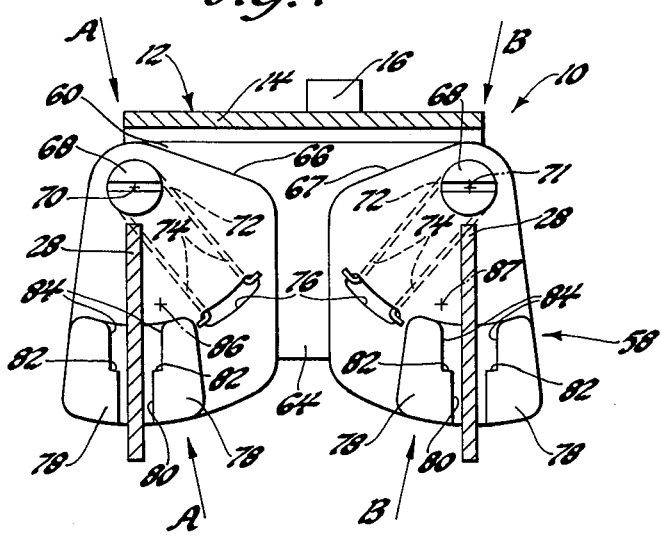
FIG. 3 is a sectional and plan view of the retractor taken generally along line 3—3 of FIG. 2 and shows the locking members of the retractor in nonlocking positions where belt unwinding reel rotation is possible.

Adjacent the lower side of belt reel 26, the retractor 10 includes a locking arrangement generally indicated by 58. A support member 60 of this locking arrangement is secured to the lower end of housing base wall 14 by screw bolts 62 so that a planar base 64 of this support member is oriented in a horizontally extending condition. Additional reference to FIG. 3 shows that the upper side of this base 64 supports a pair of locking members 66 and 67 that are symmetrical about a vertical plane through the central portion of and perpendicular to the housing base wall 14. A pair of screw bolts 68 pivotally support the locking members 66 and 67 on the support member base 64 for movement about spaced vertical axes 70 and 71, respectively. The screw bolts 68 are respectively encircled by a pair of torsion springs 72 that are suitably secured thereto and legs 74 of these springs extend radially outwardly from the screw bolts so as to be received within arcuate slots 76 within the associated locking members 66 and 67. These springs normally bias the locking members 66 and 67 to the nonlocking position that are shown by FIG. 3.

As can be seen by reference to FIGS. 1 through 3, each locking member 66 and 67 has a pair of integral locking portions 78 that extend upwardly from the planar configuration of the locking member in spaced relationship to each other so as to define a slot 80 which normally receives the annular ratchet configuration of the adjacent reel end plate 28 in the nonlocking position shown by FIG. 3. Adjacent the end of each slot 80 closest to its associated screw bolt 68, as seen in FIG. 3, the locking projections include locking surfaces 82 facing toward the screw bolts. These locking surfaces 82 are engaged by the locking surfaces 32 of the annular ratchet configurations 30 on the reel end plates upon pivoting movement of the locking members to locking positions as shown by FIGS. 4 and 5. Stop surfaces 84 of the locking portions 78 extend generally radially with respect to the axes of pivotal movement 70 and 71 of their respective locking members 66 and 67, and each pair of these stop surfaces on each locking member face each other in a generally opposed relationship. These stop surfaces extend upwardly a sufficient height so as to engage the reel end plates 28 as shown in FIGS. 4 and 5 and thereby limit pivotal movement of the locking members 66 and 67 in either clockwise or counterclockwise directions.

Vehicle acceleration or deceleration in any horizontal direction moves at least one of the locking members 66 or 67 from its nonlocking position toward one of its locking positions in a manner that will be more fully hereinafter described. This pivotal movement of the locking member acts against the bias of the associated spring 72 and moves the locking member toward one of the locking positions shown in FIGS. 4 and 5. It is noted that each locking member may move in either a clockwise or counterclockwise direction independently of the other in order to engage one of its locking surfaces 82 with one of the locking surfaces 32 on the associated reel end plate. As the locking surfaces 32 and 82 engage each other, the belt reel 26 is thereby prevented from rotating clockwise as viewed in FIG. 2 and belt unwinding is thus halted. Movement of a belted vehicle occupant will then tension belt 24 so as to bodily pivot the reel 26 clockwise about these engaged locking surfaces from the position of FIG. 2 to the position of FIG. 6. This pivoting movement of the reel 26 to the right thus moves the ends of reel shaft 38 to the opposite ends of the housing side wall apertures 43 against the bias of springs 44, and thereby engages the fixed locking portions 56 of flange 54 with a pair of locking surfaces 32 on the end plates of the belt reel. These fixed locking portions of the retractor housing then hold the belt reel securely against belt unwinding rotation to thereby restrain a belted vehicle occupant.

The manner in which the locking members 66 and 67 move to their locking positions will now be described by reference to FIG. 3. The mass centers of locking members 66 and 67 as viewed in the horizontal plane of FIG. 3 are respectively indicated by 86 and 87 and are respectively located along lines through the solid line indicated opposed sets of arrows A—A and B—B, and these lines pass through the respective axes 70 and 71. Vehicle acceleration in any horizontal direction except along these lines will cause the centers of mass of both of the locking members to pivot about their respective pivotal axes 70 and 71 toward respective locking positions so as to initiate locking of the retractor belt reel in the manner previously described. However, vehicle acceleration or deceleration along either of these sets of arrows will not tend to pivot the locking member whose mass center is aligned with the axis of pivotal movement 70 or 71 and with the acceleration or deceleration. However, the lines through these sets of arrows A—A and B—B converge at a finite angle and the other locking member will thus be pivoted toward one of its locking positions by this acceleration or deceleration along one of the sets of arrows.

If an acceleration or deceleration pulse is generated along one of the arrows A, the pulse will act on locking member 66 through its center of mass 86 and through its axis of pivotal movement 70. This pulse will thus not cause movement of the locking member 66 due to its aligned condition with the pivotal axis 70 and the center of mass 86. However, at the same time, the acceleration or deceleration pulse along arrow A will act on the center of mass 87 of locking member 67. Due to the convergence of the lines through the centers of mass and the axes of pivotal locking member movement, as previously specified, this pulse must act on locking member 67 in a direction that will cause movement of locking member 67 from the nonlocking position shown by FIG. 3 toward a locking position that will engage one of the locking surfaces 82 of this locking member with the associated reel end plate 28. In a similar manner, if a vehicle acceleration or deceleration pulse acts along one of the arrows B through the center of mass 87 of locking member 67 and through the axis of pivotal movement 71 of this locking member, this pulse will act on locking member 66 in a direction that will move it toward one of its locking positions so as to lock the belt reel. Vehicle acceleration or deceleration in any horizontal direction will thus cause at least one of the locking members 66 or 67 to move toward one of its locking positions, and a predetermined amount of this movement of the locking member will cause one of its locking surfaces 82 to engage the belt reel and initiate locking of the retractor belt reel.

FIG. 7 shows another embodiment of the retractor according to this invention which is indicated generally by 88. This retractor embodiment is similar to the one shown by FIGS. 1 through 6 so that it is believed proper to identify like components thereof with like numerals and the major portion of the description of the other retractor is likewise applicable to this retractor except for the exceptions that will be noted. This retractor is designed to be mounted at an inclined orientation so that the axis of belt reel rotation through belt reel shaft 38 is inclined with respect to the horizontal instead of being generally horizontal as with the other retractor. This type of inclination allows the belt 24 to pass upwardly and forwardly over a vehicle occupant's lap in an angular configuration which is generally desirable for vehicle lap belts. In order to accommodate the locking members 66 and 67 for movement in horizontal planes, the support member 90 of this retractor embodiment defines upper and lower horizontal bases 92 and 94 for receiving and pivotally supporting the locking members 66 and 67. The locking member 66 and 67 of this retractor embodiment have their axes of pivoting and centers of mass arranged in the same manner as those shown in FIG. 3 when viewed in a vertical direction, and thus respond in the manner described above in order to initiate locking of the retractor belt reel against belt unwinding rotation. Each of these locking members also has its slot 80 between the locking portions 78 thereof arranged in a horizontally inclined relationship so as to receive the end plates of the belt reel 26 with the sides of the slot parallel to the inner and outer surfaces of the end plates.

It is believed evident from the foregoing description that this invention provides an improved vehicle body occupant restraint belt retractor.

What is claimed is:

1. In a vehicle occupant restraint belt retractor including a housing adapted to be mounted on a vehicle, a belt reel rotatably supported by the housing and having a belt attached thereto for winding and unwinding with respect thereto during rotation thereof in opposite directions, a pair of end plates at the ends of the reel defining annular ratchet configurations at the peripheries thereof, and winding spring means normally biasing the belt reel in the belt winding direction of rotation to store the belt thereon, an inertia locking arrangement for the retractor comprising:

a pair of locking members respectively associated with the end plates of the belt reel and respectively pivoted to the retractor housing for movement about a pair of generally vertical axes that are spaced with respect to each other, each locking member including a pair of locking portions that are spaced from each other a greater distance than the thickness of the associated reel end plate;

positioning spring means pivotally locating each locking member in a nonlocking position where the locking portions thereof are positioned on opposite sides of the annular ratchet configuration on the associated reel end plate so as to allow belt winding and unwinding reel rotation, the center of mass of each locking member in the nonlocking position being located along a line through the associated pivotal axis of locking member movement and this line converging with a similar line of the other locking member in a finite angle when viewed in a vertical direction, vehicle acceleration or deceleration in any horizontal direction pivotally moving at least one of the locking members against the bias of the positioning spring means, and a predetermined amount of this pivotal movement positioning the one locking member in a locking position where one of the locking portions thereof engages the ratchet configuration of the associated reel end plate to prevent belt unwinding reel rotation.

2. In a vehicle occupant restraint belt retractor including a housing adapted to be mounted on a vehicle, a belt reel rotatably supported by the housing and having a belt attached thereto for winding and unwinding with respect thereto during rotation thereof in opposite directions, a pair of end plates at the ends of the reel defining annular ratchet configurations at the peripheries thereof, and winding spring means normally biasing the belt reel in the belt winding direction of rotation to store the belt thereon, an inertia locking arrangement for the retractor comprising:

a pair of symmetrical locking members respectively associated with the end plates of the belt reel and respectively pivoted to the retractor housing adjacent the lower side of the retractor belt reel for movement about a pair of generally vertical axes that are spaced with respect to each other, each locking member having a horizontally extending generally planar configuration and including a pair of upwardly projecting locking portions spaced from each other a greater distance than the thickness of the associated reel end plate;

a pair of positioning springs respectively associated with the locking members, each positioning spring being fixed with respect to the retractor housing and with respect to the associated locking member in a manner that pivotally locates the associated locking member in a nonlocking position where the locking portions thereof are positioned on opposite sides of the annular ratchet configurations on the associated reel end plate so as to allow belt winding and unwinding reel rotation, the center of mass of each locking member in the nonlocking position being located along a line through the associated pivotal axis of locking member movement and this line converging with a similar line of the other locking member in a finite angle when viewed in a vertical direction, vehicle acceleration or deceleration in any horizontal direction pivotally moving at least one of the locking members against the bias of the positioning spring thereof, and a predetermined amount of this pivotal movement positioning the one locking member in a locking position where one of the locking portions thereof engages the ratchet configuration of the associated reel end plate to prevent belt unwinding reel rotation.

3. A vehicle occupant restraint belt retractor comprising:

a housing adapted to be mounted on a vehicle and including a pair of fixed locking portions in spaced relationship to each other;

a belt reel having a belt attached thereto so as to be wound and unwound with respect thereto during reel rotation in opposite directions, the reel having a pair of end plates at the ends thereof and these end plates defining annular ratchet configurations, means rotatably supporting the reel on the housing for belt winding and unwinding rotation in spaced relationship to the fixed locking portions thereof and for movement toward the fixed locking portions to engage the ratchet configurations on the reel end plates with these locking portions in a manner that prevents belt unwinding reel rotation, first spring means normally biasing the belt reel away from the fixed locking portions of the housing, and second spring means normally biasing the reel in the belt winding direction of rotation to store the belt thereon; and an inertia locking arrangement for the retractor including a pair of symmetrical locking members respectively associated with the end plates of the belt reel and respectively pivoted to the retractor housing adjacent the lower side of the belt reel for movement about a pair of generally vertical axes that are spaced with respect to each other, each locking member including a pair of locking portions that are spaced from each other a greater distance than the thickness of the associated reel end plate, and a pair of positioning springs respectively associated with the locking members, each positioning spring extending between the housing and the associated locking member in a manner that pivotally locates the locking member in a nonlocking position where the locking portions thereof are positioned on opposite sides of the annular ratchet configuration on the associated reel end plate so as to allow belt winding and unwinding reel rotation, the center of mass of each locking member in the nonlocking position being located along a line through the associated pivotal axis of locking member movement and this line converging with a similar line of the other locking member in a finite angle when viewed in a vertical direction, vehicle acceleration or deceleration in any horizontal direction pivotally moving at least one of the locking members against the bias of the positioning spring thereof, a predetermined amount of this pivotal movement positioning the one locking member in a locking position where one of the locking portions thereof engages the ratchet configuration of the associated reel end plate to initially halt belt unwinding reel rotation, and belt tension subsequent to the initial halting of unwinding reel rotation moving the belt reel bodily against the bias of the first spring means so as to engage the ratchet configurations on the reel end plates with the fixed locking portions of the housing so that these housing locking portions then hold the belt reel against unwinding rotation.

4. A vehicle occupant restraint belt retractor comprising:

a housing adapted to be mounted on a vehicle and including a pair of fixed locking portions in horizontally spaced relationship to each other;

a belt reel having a belt attached thereto so as to be wound and unwound with respect thereto during reel rotation in opposite directions, the reel having a pair of generally planar end plates at the ends thereof and these end plates defining annular ratchet configurations, means rotatably supporting the reel on the housing for belt winding and unwinding rotation about a horizontal axis with the end plates in spaced relationship to the fixed locking portions thereof and for bodily movement toward the fixed locking portions to engage the ratchet configurations on the reel end plates with these locking portions in a manner that prevents belt unwinding reel rotation, first spring means normally biasing the belt reel away from the fixed locking portions of the housing, and second spring means normally biasing the reel in the belt winding direction of rotation to store the belt thereon; and a pair of symmetrical locking members respectively associated with the end plates of the belt reel and respectively pivoted to the retractor housing adjacent the lower side of the belt reel for movement about a pair of generally vertical axes that are spaced with respect to each other, the locking members having generally planar configurations that are aligned with each other in a generally coplanar and horizontal relationship, each locking member including upstanding locking portions in spaced relationship to each other a greater distance than the thickness of the associated reel end plate and stop surfaces that engage the reel end plates to limit the pivotal movement of the locking members from nonlocking positions, and a pair of positioning springs respectively associated with the locking members and the retractor housing so as to position the locking members in the nonlocking positions where the locking portions thereof are positioned on opposite sides of the annular ratchet configurations on the associated reel end plates so as to allow belt winding and unwinding reel rotation, the center of mass of each locking member in the nonlocking position being located along a line through the associated pivotal axis of locking member movement and this line converging with a similar line of the other locking member in a finite angle when viewed in a vertical direction, vehicle acceleration or deceleration in any horizontal direction pivotally moving at least one of the locking members against the bias of the positioning spring thereof, a predetermined amount of this pivotal movement positioning the one locking member in a locking position where one of the locking portions thereof engages the ratchet configuration of the associated reel end plate to initially halt belt unwinding reel rotation, and belt tension subsequent to the initial halting of unwinding reel rotation moving the belt reel bodily against the bias of the first spring means so as to engage the ratchet configurations on the reel end plates with the fixed locking portions of the housing so that these housing locking portions then hold the belt reel against unwinding reel rotation.

5. A vehicle occupant restraint belt retractor comprising:

a housing adapted to be mounted on a vehicle and including a pair of fixed locking portions located in a horizontally inclined relationship with respect to each other;

a belt reel having a belt attached thereto so as to be wound and unwound with respect thereto during reel rotation in opposite directions, the reel having a pair of generally planar end plates at the ends thereof and these end plates defining annular ratchet configurations, means rotatably supporting the reel on the housing in a horizontally inclined orientation with the end plates respectively spaced from the fixed locking portions of the housing and also supporting the reel for bodily movement toward the fixed locking portions of the housing to engage the ratchet configurations on the reel end plates with these locking portions in a manner that prevents belt unwinding reel rotation, first spring means normally biasing the belt reel away from the fixed locking portions of the housing, and second spring means normally biasing the reel in the belt winding direction of rotation to store the belt thereon; and a pair of symmetrical locking members respectively associated with the end plates of the belt reel and respectively pivoted to the retractor housing adjacent the lower side of the belt reel for movement about a pair of generally vertical axes that are spaced with respect to each other, the locking members having generally planar configurations that are located in horizontal orientations in vertically spaced relationship with respect to each other so as to be respectively adjacent the annular ratchet configurations on the end plates of the reel, each locking member including upstanding locking portions in spaced relationship to each other a greater distance than the thickness of the associated reel end plate and stop surfaces that engage the reel end plates to limit the pivotal movement of the locking members from nonlocking positions, and a pair of positioning springs respectively associated with the locking members and the retractor housing so as to position the locking members in the nonlocking positions where the locking portions thereof are positioned on opposite sides of the annular ratchet configurations on the associated reel end plates so as to allow belt winding and unwinding reel rotation, the center of mass of each locking member in the nonlocking position being located along a line through the associated pivotal axis of locking member movement and this line converging with a similar line of the other locking member in a finite angle when viewed in a vertical direction, vehicle acceleration or deceleration in any horizontal direction pivotally moving at least one of the locking members against the bias of the positioning spring thereof, a predetermined amount of this pivotal movement positioning the one locking member in a locking position where one of the locking portions thereof engages the ratchet configuration of the associated reel end plate to initially halt belt unwinding reel rotation, and belt tension subsequent to the initial halting of unwinding reel rotation moving the belt reel bodily against the bias of the first spring means so as to engage the ratchet configurations on the reel end plates with the fixed locking portions of the housing so that these housing locking portions then hold the belt reel against unwinding reel rotation.

* * * * *